(12) United States Patent
Togiya (10) Patent No.: US 9,409,720 B2
(45) Date of Patent: Aug. 9, 2016

(54) MEDIUM CARRYING MECHANISM

(75) Inventor: Hajime Togiya, Gumma (JP)

(73) Assignee: OKI ELECTRIC INDUSTRY CO., LTD., Tokyo (JP)

(*) Notice: Subject to any disclaimer, the term of this patent is extended or adjusted under 35 U.S.C. 154(b) by 0 days.

(21) Appl. No.: 13/990,786

(22) PCT Filed: Nov. 4, 2011

(86) PCT No.: PCT/JP2011/075486
§ 371 (c)(1),
(2), (4) Date: May 30, 2013

(87) PCT Pub. No.: WO2012/077440
PCT Pub. Date: Jun. 14, 2012

(65) Prior Publication Data
US 2013/0248334 A1    Sep. 26, 2013

(30) Foreign Application Priority Data
Dec. 8, 2010   (JP) ................ 2010-273994

(51) Int. Cl.
| | | |
|---|---|---|
| B65G 15/00 | (2006.01) | |
| B65G 37/00 | (2006.01) | |
| B65H 5/06 | (2006.01) | |
| B65H 5/02 | (2006.01) | |
| B65H 5/38 | (2006.01) | |

(52) U.S. Cl.
CPC .......... *B65G 37/00* (2013.01); *B65H 5/025* (2013.01); *B65H 5/062* (2013.01); *B65H 5/38* (2013.01); *B65H 2402/441* (2013.01); *B65H 2404/1531* (2013.01); *B65H 2404/264* (2013.01); *B65H 2404/513* (2013.01); *B65H 2404/611* (2013.01); *B65H 2701/1912* (2013.01)

(58) Field of Classification Search
CPC ........................................................ B65H 5/025
USPC ............... 198/836.1, 836.2, 620, 624, 626.1; 271/272, 275
See application file for complete search history.

(56) References Cited

U.S. PATENT DOCUMENTS

| | | | | |
|---|---|---|---|---|
| 3,924,847 A | * | 12/1975 | Pescetto | G07D 7/04 194/202 |
| 3,999,696 A | | 12/1976 | Reba et al. | |
| 4,453,870 A | * | 6/1984 | Bean | 414/789 |
| 5,054,768 A | | 10/1991 | Iseda | |
| 5,121,916 A | * | 6/1992 | Sanchez | 271/272 |
| 5,205,551 A | * | 4/1993 | Nagano et al. | 271/225 |
| 5,685,539 A | * | 11/1997 | Janatka et al. | 271/273 |
| 5,697,880 A | * | 12/1997 | Auerbach | 493/420 |

(Continued)

FOREIGN PATENT DOCUMENTS

| | | |
|---|---|---|
| JP | 60-213655 A | 10/1985 |
| JP | 1986/92651 U | 6/1986 |

(Continued)

*Primary Examiner* — William R Harp
(74) *Attorney, Agent, or Firm* — Rabin & Berdo, P.C.

(57) ABSTRACT

Provided is an inexpensive and lightweight carrying mechanism in which side frames and a guide plate are not required to be formed separately and assembled and a small number of components are required. A pair of right and left side frames (2a, 2b) and a medium guide (3) are integrally formed to form a frame structure body (1). On one surface side of the medium guide (3) of the frame structure body (1), a carrying belt (8) for carrying a medium is disposed, and on the other surface side of the medium guide (3), a driven roller (10) for holding the medium between the carrying belt (8) and itself is disposed.

21 Claims, 5 Drawing Sheets

(56) References Cited

U.S. PATENT DOCUMENTS

| | | |
|---|---|---|
| 5,788,227 A | 8/1998 | Hendrix et al. |
| 6,460,687 B1 * | 10/2002 | Escobedo et al. ............ 198/624 |
| 2005/0194236 A1 | 9/2005 | Wilmo et al. |
| 2009/0008215 A1 | 1/2009 | Bell |

FOREIGN PATENT DOCUMENTS

| | | |
|---|---|---|
| JP | 01-093383 A | 4/1989 |
| JP | 1990/37148 U | 3/1990 |
| JP | H2-251975 | 10/1990 |
| JP | 04-112061 A | 4/1992 |
| JP | 1993/46848 U | 6/1993 |
| JP | 07-027857 U | 5/1995 |
| JP | 8-268617 | 10/1996 |
| JP | 10-016334 A | 1/1998 |
| JP | H11-232527 | 8/1999 |
| JP | 2003-226442 A | 8/2003 |
| SU | 797599 A3 | 1/1981 |

* cited by examiner

FIG.10

MEDIUM CARRYING MECHANISM

TECHNICAL FIELD

The present invention relates to a medium carrying mechanism that conveys a medium such as a banknote in a banknote accepting and dispensing apparatus.

BACKGROUND ART

Known medium carrying mechanisms of this type include for example the medium carrying mechanism disclosed in Japanese Patent Application Laid-Open (JP-A) No. 11-232527. The medium carrying mechanism of JP-A No. 11-232527 includes, between a left and right pair of side frames, a conveyor belt that faces in the up-down direction and that grips and conveys a banknote (medium), and a plate shaped medium guide that guides a conveyed medium and faces in the up-down direction.

In banknote accepting and dispensing apparatuses and the like, there are also carrying mechanisms, such as that disclosed in JP-A No. 08-268617, wherein in configuring a conveyance path a banknote (medium) is conveyed around a conveyor drum of comparatively large diameter. In the carrying mechanism of JP-A No. 08-268617 a conveyor belt that conveys banknotes is disposed so as to contact the periphery of a conveyor drum of large diameter supported by a shaft inside a casing (side frames), and a banknote fed out from a classification section is gripped between the conveyor belt and the conveyor drum. The banknote is conveyed around the conveyor drum by rotation of the conveyor belt.

DISCLOSURE OF INVENTION

Technical Problem

However, there is the following problem with the known technology described above.

In the medium carrying mechanism disclosed in JP-A No. 11-232527, with the problem of an increased number of components and a high cost due to the side frames and the medium guide being formed separately then assembled, and due to providing a conveyance section configured by a belt.

Moreover, in the medium carrying mechanism disclosed in JP-A No. 11-232527, it is still necessary to provide a medium guide around the conveyor drum in order to convey the medium stably. However also in such cases, it is anticipated that the medium guide and the side frames that support the drum will be formed separately and assembled, and then the conveyor drum disposed, resulting in the issue of an increased number of components and high cost.

The present invention is directed towards resolving such problems.

Solution to Problem

A medium carrying mechanism of the present invention accordingly includes a pair of left and right side frames, a conveyance section disposed between the side frames, and a plate shaped medium guide that guides a medium conveyed by the conveyance section, wherein: the side frames and the medium guide are integrally formed; the conveyance section is disposed on one face side of the medium guide; and a gripping section is provided on another face side of the medium guide and grips a medium between the gripping section and the conveyance section.

Advantageous Effects of Invention

Due to the structure of the present invention being thus configured by integrally forming the pair of left and right side frames and the medium guide, disposing a conveyor belt that conveys the medium on the one face side of the medium guide, and disposing a following roller that grips the medium between the following roller and the conveyor belt on the other face side of the medium guide, the advantageous effects are obtained of removing the need to separately form and assemble side frames and a guide plate, and enabling a lightweight medium carrying mechanism to be achieved with a small number of components and at low cost.

BEST MODE FOR CARRYING OUT THE INVENTION

Explanation follows regarding exemplary embodiments of a medium carrying mechanism of the present invention with reference to the drawings.

First Exemplary Embodiment

Figure 1:
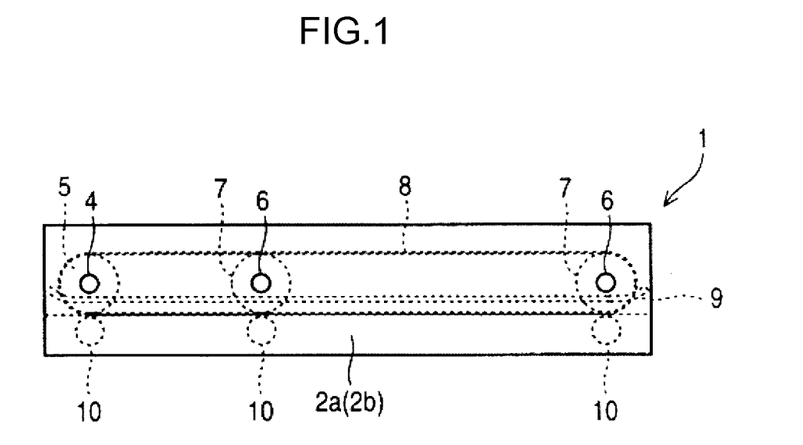
FIG. 1 is a side view illustrating a first exemplary embodiment.
Figure 2:
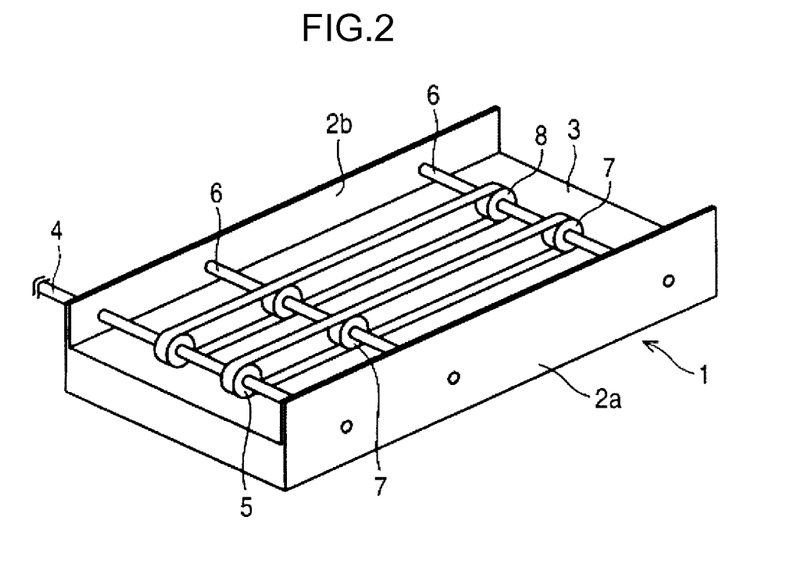
FIG. 2 is a perspective view illustrating the first exemplary embodiment.

FIG. 1 is a side view illustrating a first exemplary embodiment, and FIG. 2 is a perspective view illustrating the first exemplary embodiment. A frame structure body 1 is integrally formed by molding plastic so as to include a pair of left and right side frames 2a, 2b and a plate shaped medium guide 3 that guides conveyance of a medium.

A drive shaft 4 and idle shafts 6 are disposed parallel to each other in a space on one face side (the upper side in the drawings) of the medium guide 3 of the frame structure body 1. The two ends of the drive shaft 4 and the idle shafts 6 are respectively rotatably supported by the side frames 2a, 2b. Driving force is transmitted to the drive shaft 4 from a power source, not shown in the drawings, on the outside of the side frame 2b (or 2a), through for example gears or a belt. Although two of the idle shafts 6 are provided in the drawings, there is no limitation thereto.

Plural drive pulleys 5 are fixed to the drive shaft 4 at specific intervals, and plural following pulleys 7 are fixed to each of the idle shafts 6 at the same intervals as the drive pulleys 5.

Plural conveyor belts 8 serving as a conveyance section that conveys a medium are disposed parallel to each other, and are entrained around the drive pulleys 5 and the plural following pulleys 7. The conveyor belts 8 travel due to the drive pulleys being rotated through the drive shaft 4 by the power source, not shown in the drawings, and each of the following pulleys 7 rotate to follow the travel of the conveyor belts 8 when this occurs.

Note that the medium guide 3 of the frame structure body 1 is provided with elongated holes (slits), not shown in the drawings, over the entire position facing the conveyor belts 8. Although, in the drawings, two of the drive pulleys 5, two of the following pulleys 7 per idle shaft 6, and two of the conveyor belts 8 are provided, there is no limitation thereto.

A plate shaped medium guide 9 (omitted from illustration in FIG. 2) that forms a pair with the medium guide 3 is disposed between the side frames 2a, 2b so as to face the medium guide 3 across a specific gap. The medium guide 9 is pre-inserted inside each of the conveyor belts 8, with the two sides of the medium guide 9 fixed to the side frames 2a, 2b.

Following rollers 10, serving as a gripping section, that grip a medium such as a banknote, not shown in the drawings, between the following rollers 10 and the conveyor belts 8, are disposed on the other face side (the lower side in the drawings) of the medium guide 3 at positions corresponding to the drive pulleys 5 and each of the following pulleys 7. Both ends of respective shafts, not shown in the drawings, that support the following rollers 10, are inserted into elongated holes, not shown in the drawings, provided to the side frames 2a, 2b in a vertical direction, namely the facing direction of the medium guides 3, 9, so as to be capable of moving in the length direction, and are biased towards the conveyor belts 8 side by for example springs, not shown in the drawings. Each of the following rollers 10 accordingly contacts the conveyor belts 8 at positions corresponding to the drive pulleys 5 and each of the following pulleys 7. Note that the positions where the following rollers 10 contact the conveyor belts 8 are preferably at the same position as the upper face of the medium guide 3 or slightly higher.

The thus configured medium carrying mechanism grips a medium such as a banknote, not shown in the drawings, between the conveyor belts 8 and the following rollers 10, and is capable of conveying the medium due to the conveyor belts 8 travelling with the rotation of the drive pulleys 5 through the drive shaft 4 by the power source, not shown in the drawings, thereby enabling the medium to be stably conveyed, guided by the medium guides 3, 9.

As explained above, the first exemplary embodiment has a structure configured by the frame structure body 1 integrally formed with the pair of left and right side frames 2a, 2b and the medium guide 3, the conveyor belts 8 that convey the medium disposed on one face side of the medium guide 3 of the frame structure body 1, and the following rollers 10 that grip the medium between the following rollers 10 and the conveyor belts 8 disposed on the other face side of the medium guide 3. Such a structure accordingly obtains the advantageous effects of removing the need to separately form and assemble side frames and a guide plate, and enabling a lightweight medium carrying mechanism to be achieved with a small number of components and at low cost.

Second Exemplary Embodiment

Figure 3:
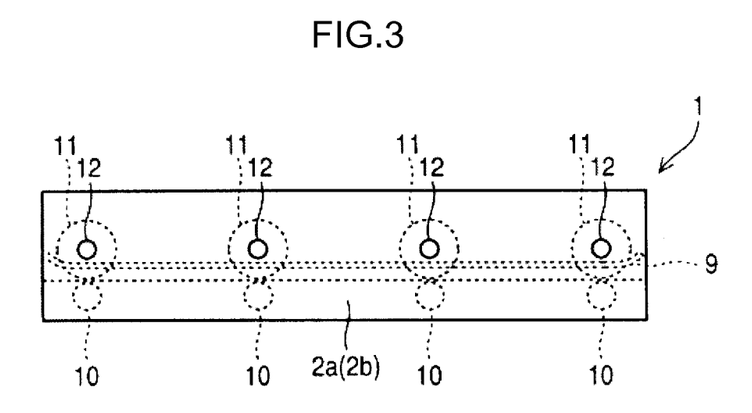
FIG. 3 is a side view illustrating a second exemplary embodiment.
Figure 4:
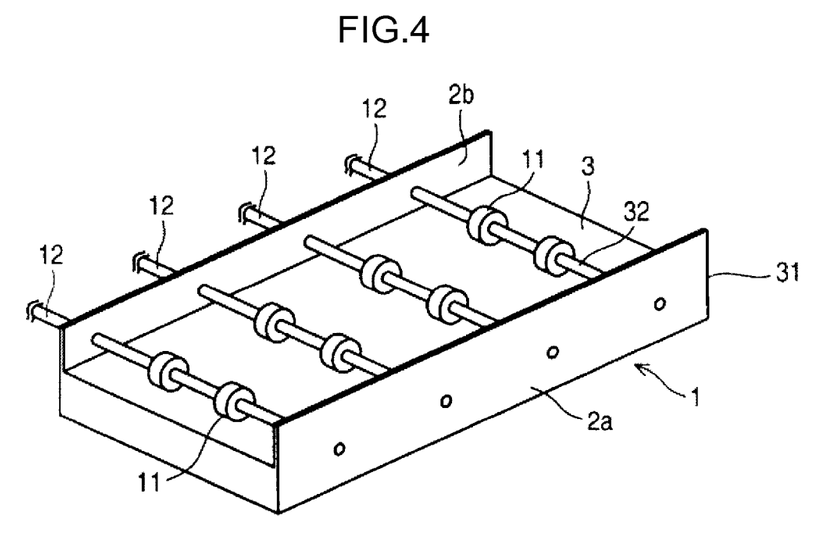
FIG. 4 is a perspective view illustrating the second exemplary embodiment.

FIG. 3 is a side view of a second exemplary embodiment, and FIG. 4 is a perspective view of the second exemplary embodiment. In the second exemplary embodiment, conveyance rollers 11 are provided in the place of the conveyor belts 8 as the conveyance section that conveys a medium.

The conveyance rollers 11 are disposed parallel to each other in a space on one face side of a medium guide 3 of a frame structure body 1. The conveyance rollers 11 are fixed at specific intervals to plural shafts 12 (4 shafts shown in the drawings), and both ends of each of the shafts 12 are respectively rotatably supported by side frames 2a, 2b. Driving force is transmitted from a power source, not shown in the drawings, at the outside of the side frame 2b (or 2a), through for example gears or a belt, to a given shaft 12. This driving force is also transmitted to the other shafts 12 through gears or belts, not shown in the drawings.

A medium guide 9 (omitted from illustration in FIG. 4) is disposed between the side frames 2a, 2b so as to face the medium guide 3 across a specific gap, similarly to in the first exemplary embodiment. However, in the present exemplary embodiment, the medium guide 9 is provided with holes at positions corresponding to each of the conveyance rollers 11, with the conveyance rollers 11 projecting through the holes towards the medium guide 3 side.

Following rollers 10 are disposed on the other face side of the medium guide 3 at positions corresponding to each of the conveyance rollers 11. Similarly to in the first exemplary embodiment, both ends of respective shafts, not shown in the drawings, that support the following rollers 10 are inserted into elongated holes, not shown in the drawings, provided to the side frames 2a, 2b so as to be capable of movement in the length direction, and are biased by for example springs, not shown in the drawings, towards the side of the conveyance rollers 11, such that each of the following rollers 10 contact each of the conveyance rollers 11. Note that the positions where the drive rollers 10 contact the conveyance rollers 11 are preferably at the same position as the upper face of the medium guide 3 or slightly higher.

The thus configured medium carrying mechanism grips a medium such as a banknote, not shown in the drawings, between the conveyance rollers 11 and the following rollers 10, and can convey the medium due to the conveyor belts 8 travelling by rotation of the drive pulleys 5 through the drive shaft 4 by the power source, not shown in the drawings, thereby enabling stable conveyance, with both the upper and lower faces of the medium guided by the medium guide 3 and the medium guide 9.

As explained above, the second exemplary embodiment is configured with a structure in which the frame structure body 1 is integrally formed with the pair of left and right side frames 2a, 2b and the medium guide 3, the conveyance rollers 11 that convey the medium are disposed to one face side of the medium guide 3 of the frame structure body 1, and the following rollers that grip the medium between the following rollers and the conveyor belts 8 disposed at the other face side of the medium guide 3. Such a structure accordingly obtains the advantageous effects of removing the need to separately form and assemble side frames and a guide plate, and enabling a lightweight medium carrying mechanism to be achieved with a small number of components and at low cost, similarly to in the first exemplary embodiment.

Although, in the second exemplary embodiment described above, the conveyance rollers 11 are disposed on the one face side of the medium guide 3, and the following rollers 10 are disposed on the other face side of the medium guide 3, however the conveyance rollers 11 and the following rollers 10 may be disposed the other way around.

Third Exemplary Embodiment

Figure 5:
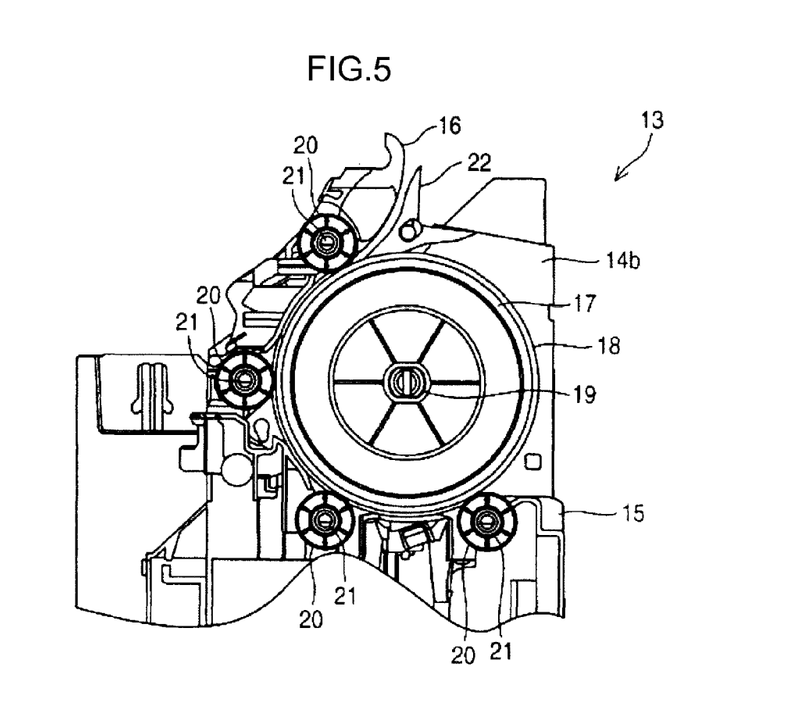
FIG. 5 is a side view illustrating a third exemplary embodiment.
Figure 6:
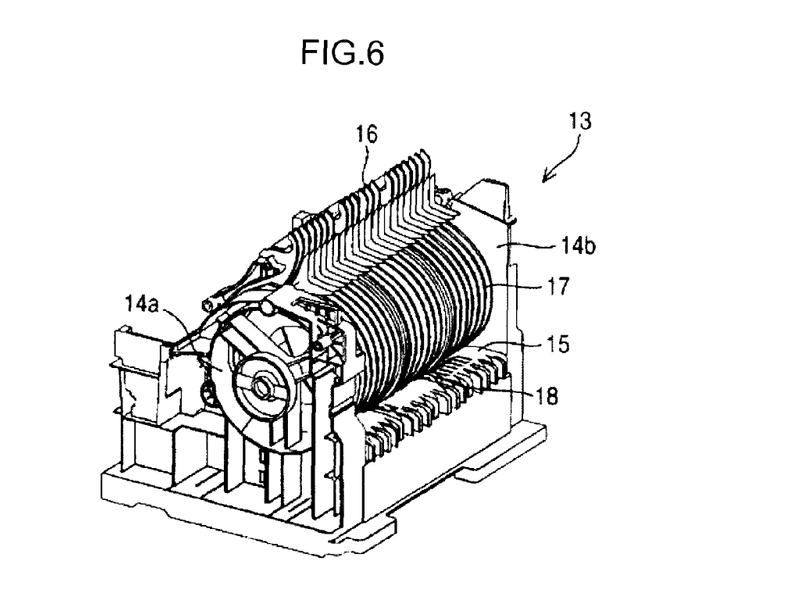
FIG. 6 is a perspective view illustrating the third exemplary embodiment.

FIG. 5 is a side view of a third exemplary embodiment, and FIG. 6 is a perspective view of the third exemplary embodiment, illustrating a frame structure body 13, a separate medium guide 16, a conveyor drum 17 serving as a conveyance section that conveys a medium, following rollers 20 serving as a gripping section that grip the medium between the following rollers 20 and the conveyor drum 17, and blades 22. The conveyor drum 17 is formed with a large diameter that is larger than the diameter of the following rollers 20.

Figure 7:
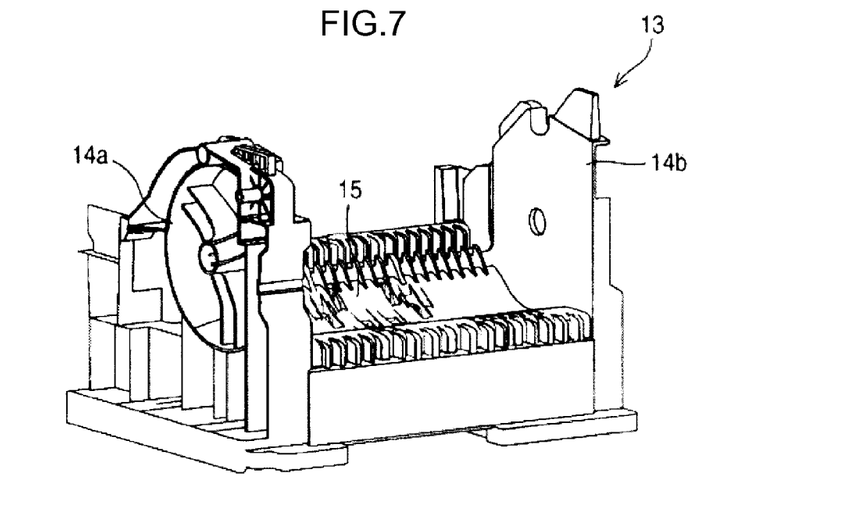
FIG. 7 is a perspective view illustrating a frame structure body.

FIG. 7 is a perspective view of the frame structure body 13. As shown in FIG. 7, the frame structure body 13 of the present exemplary embodiment is integrally formed by molding plastic with a pair of left and right side frames 14a, 14b and a medium guide 15 that guides conveyance of a medium. The medium guide 15 accordingly includes a circular arc shaped inner peripheral face, with the inner peripheral face formed with a size that faces about ⅓ of the outer periphery of the conveyor drum 17.

Figure 8:
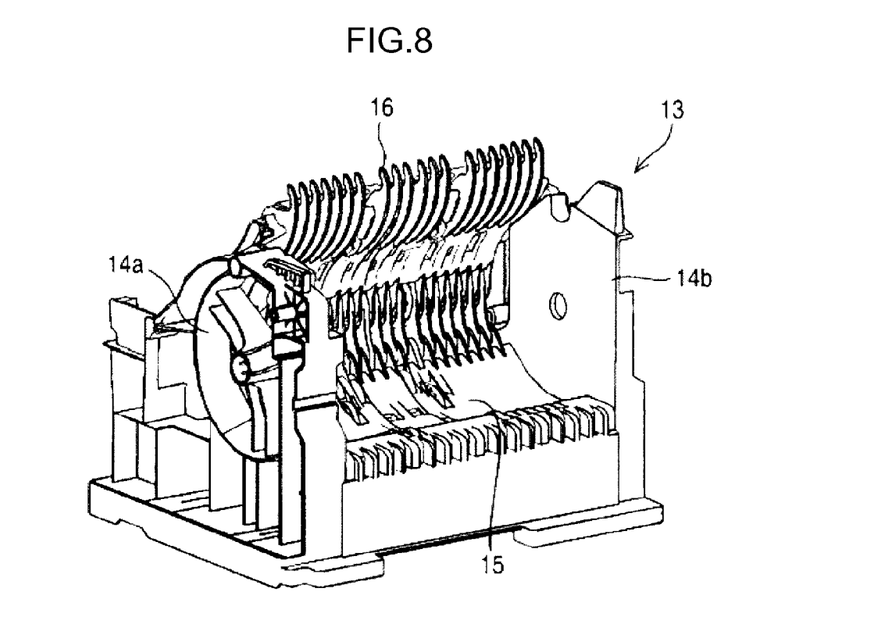
FIG. 8 is a perspective view illustrating a separate medium guide combined with a frame structure body.

FIG. 8 is a perspective view of the separate medium guide 16 combined with the frame structure body 13. The separate medium guide 16 has a circular arc shaped inner peripheral face similar to that of the medium guide 15, with the inner peripheral face formed with a size that faces about ¼ of the outer periphery of the conveyor drum 17. The separate medium guide 16 is disposed so as to extend from an upper edge of the medium guide 15, and the blades 22 that switch the conveyance direction of the medium are disposed at an edge portion of the separate medium guide 16.

Figure 9:
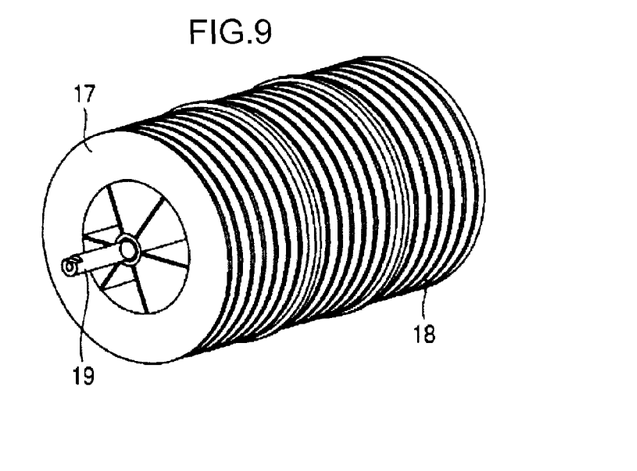
FIG. 9 is a perspective view illustrating a conveyor drum.

FIG. 9 is a perspective view of the conveyor drum 17, and as shown in FIG. 9, plural high friction members 18 are provided at specific intervals around the outer periphery of the conveyor drum 17 of the present exemplary embodiment. The conveyor drum 17 is disposed between the side frames 14a, 14b such that the outer periphery of the conveyor drum 17 faces the inner peripheral faces of the medium guides 15, 16 across a specific gap, and both ends of a shaft 19 at a central portion of the conveyor drum 17 are rotatably supported by the side frames 14a, 14b. Driving force is transmitted to the shaft 19 from a power source, not shown in the drawings, to the outside of the side frame 14a or the side frame 14b, through for example gears or a belt.

As shown in FIG. 5, the following rollers 20 are disposed in holes provided to the medium guide 15 and the separate medium guide 16 of the frame structure body 13, with both ends of shafts 21 at central portions of the following rollers 20 rotatably supported by the medium guides 15 and 16, or the side frames 14a, 14b.

Plural (four in FIG. 5) of the following rollers 20 are disposed around the circumferential direction, with each of the following rollers 20 biased by for example torsion springs, not shown in the drawings, so as to contact the outer periphery of the conveyor drum 17.

The thus configured medium carrying mechanism grips a medium such as a banknote, not shown in the drawings, between the conveyor drum 17 and the following rollers 20. The medium can be conveyed around the conveyor drum 17 due to the conveyor drum 17 being rotated through the shaft 19 by the power source, not shown in the drawings. The medium can be guided and stably conveyed by the medium guides 15, 16 in this operation.

As explained above, the third exemplary embodiment is configured with a structure in which the frame structure body 13 is integrally formed with the pair of left and right side frames 14a, 14b and the medium guide 15 that has a circular arc shaped inner peripheral face, the conveyor drum 17 of comparatively large diameter is disposed between the side frames 14a, 14b such that the outer peripheral face of the conveyor drum 17 faces the inner peripheral face of the medium guide 15 of the frame structure body 13, and the following rollers 20 that grip the medium between the following rollers 20 and the conveyor drum 17 are disposed on the medium guide 15 side. Such a structure exhibits the advantageous effects of removing the need to separately form and assemble the side frames 14a, 14b and the medium guide 15, and enabling a lightweight medium carrying mechanism to be achieved with a small number of components and at low cost, similarly to in the first exemplary embodiment.

Moreover, since in the third exemplary embodiment the medium guide 15 has a structure with a circular arc shaped inner peripheral face, by integrally forming the side frames 14a, 14b, the advantageous effect of a strong and robust structure for the frame structure body 13 is obtained.

Figure 10:
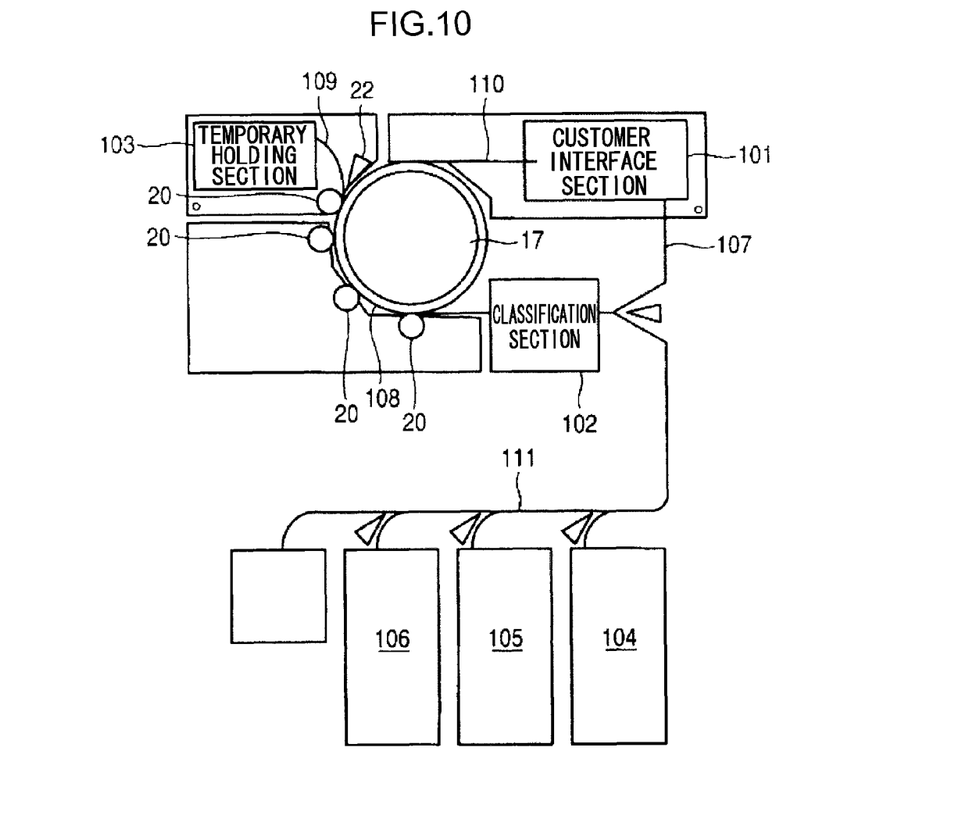
FIG. 10 is a side view illustrating an example of an internal structure of a banknote accepting and dispensing apparatus applied with an exemplary embodiment.

FIG. 10 is a side view of an example of a structure of an internal portion of a banknote accepting and dispensing device applied with the first exemplary embodiment to the third exemplary embodiment described above, illustrating: a customer interface section 101 that accepts paid-in banknotes and dispenses paid-out banknotes serving as a medium; a classification section 102 that classifies banknotes for example as genuine or counterfeit and/or by denomination; a temporary holding section 103 that during a paying in transaction temporarily holds banknotes after classification; banknote storage boxes 104 to 106 that store banknotes according to denomination; a conveyance path 107 that conveys banknotes between the customer interface section 101 and the classification section 102; a conveyance path 108 that, after classification, conveys banknotes in the direction of the temporary holding section 103 or in the direction of the customer interface section 101; a conveyance path 109 that conveys banknotes between the temporary holding section 103 and the conveyance path 108; a conveyance path 110 that conveys banknotes from the conveyance path 108 to the customer interface section 101; and a conveyance path 111 that conveys banknotes that have been taken out of the temporary holding section 103 and have passed the classification section 102 to the banknote storage boxes 104 to 106.

The operation of the banknote accepting and dispensing apparatus is not directly related to the present invention and so explanation thereof has been omitted, however the medium carrying mechanism described in the first exemplary embodiment and the second exemplary embodiment may be employed as the conveyance paths 107, 110, 111, and the medium carrying mechanism of the third exemplary embodiment may be employed as the conveyance path 108. In such cases, the medium guide 16 of the medium carrying mechanism of the third exemplary embodiment may be attached to for example a unit including the temporary holding section 103.

The invention claimed is:

1. A medium carrying mechanism comprising:
   side frames;
   a conveyance section disposed inside the side frames, the conveyance section including a drive shaft that rotates by being driven from outside the side frames, the drive shaft being supported by the side frames;
   a first medium guide that guides a medium conveyed by the conveyance section, the side frames and the first medium guide being integrally formed, the side frames being formed at each of two opposite ends of the first medium guide, and the conveyance section being disposed on one face of the first medium guide;
   a second medium guide that guides the medium conveyed by the conveyance section, the second medium guide being separate from the first medium guide, and the second medium guide is disposed so as to extend from the first medium guide; and a gripping section provided on another face of the first medium guide and grips a medium between the gripping section and the conveyance section.

2. The medium carrying mechanism of claim 1, wherein the conveyance section comprises a conveyance roller, and the gripping section comprises a following roller.

3. The medium carrying mechanism of claim 1, wherein:
the gripping section comprises a following roller,
the conveyance section comprises a conveyor drum that has a larger diameter than the following roller,
the first medium guide has a shape so that the one face is a circular arc shaped inner peripheral face of the first medium guide,
the conveyor drum is disposed such that an outer peripheral face of the conveyor drum faces the circular arc shaped inner peripheral face of the first medium guide, and
the following roller is disposed on a first medium guide side.

4. The medium carrying mechanism of claim 3, wherein a size of the inner peripheral face of the first medium guide is configured such that the inner peripheral face of the first medium guide faces about 1/3 of the outer peripheral face of the conveyor drum.

5. The medium carrying mechanism of claim 1, wherein the drive shaft directly contacts the side frames so as to be supported by the side frames.

6. The medium carrying mechanism of claim 5, wherein the conveyance section further comprises a conveyor drum disposed upon the drive shaft.

7. The medium carrying mechanism of claim 6, wherein the conveyor drum is in direct contact with the drive shaft so as to be supported by the drive shaft.

8. The medium carrying mechanism of claim 1, wherein the drive shaft penetrates through the side frames.

9. The medium carrying mechanism of claim 8, wherein the conveyance section comprises a conveyor drum disposed upon the drive shaft.

10. The medium carrying mechanism of claim 9, wherein the conveyor drum is in direct contact with the drive shaft so as to be supported by the drive shaft.

11. A medium carrying mechanism comprising:
side frames;
a conveyance section disposed inside the side frames;
a first medium guide that guides a medium conveyed by the conveyance section, the side frames and the first medium guide being integrally formed, the side frames being formed at each of two opposite ends of the first medium guide, and the conveyance section being disposed on one face of the first medium guide;
a second medium guide that guides the medium conveyed by the conveyance section, the second medium guide being separate from the first medium guide, and the second medium guide has a circular arc shaped inner peripheral face; and
a gripping section provided on another face of the first medium guide and grips a medium between the gripping section and the conveyance section.

12. The medium carrying mechanism of claim 11, wherein the circular arc shaped inner peripheral face of the second medium guide is for guiding a medium.

13. The medium carrying mechanism of claim 11, wherein the conveyance section comprises a conveyance roller, and the gripping section comprises a following roller.

14. The medium carrying mechanism of claim 11, wherein:
the gripping section comprises a following roller,
the conveyance section comprises a conveyor drum that has a larger diameter than the following roller,
the first medium guide has a shape so that the one face is a circular arc shaped inner peripheral face of the first medium guide,
the conveyor drum is disposed such that an outer peripheral face of the conveyor drum faces the circular arc shaped inner peripheral face of the first medium guide, and
the following roller is disposed on a first medium guide side.

15. The medium carrying mechanism of claim 14, wherein a size of the inner peripheral face of the first medium guide is configured such that the inner peripheral face of the first medium guide faces about 1/3 of the outer peripheral face of the conveyor drum.

16. The medium carrying mechanism of claim 11, wherein the conveyance section includes a drive shaft that rotates by being driven from outside the side frames, the drive shaft directly contacting the side frames so as to be supported by the side frames.

17. The medium carrying mechanism of claim 16, wherein the conveyance section further comprises a conveyor drum disposed upon the drive shaft.

18. The medium carrying mechanism of claim 17, wherein the conveyor drum is in direct contact with the drive shaft so as to be supported by the drive shaft.

19. The medium carrying mechanism of claim 11, wherein the conveyance section includes a drive shaft that rotates by being driven from outside the side frames, the drive shaft penetrates through the side frames.

20. The medium carrying mechanism of claim 19, wherein the conveyance section comprises a conveyor drum disposed upon the drive shaft.

21. The medium carrying mechanism of claim 20, wherein the conveyor drum is in direct contact with the drive shaft so as to be supported by the drive shaft.

* * * * *